UNITED STATES PATENT OFFICE.

HERMON JOHN, OF TACOMA, WASHINGTON.

COMPOSITION FOR MAKING BRIQUETTES.

1,407,279. Specification of Letters Patent. Patented Feb. 21, 1922.

No Drawing. Application filed October 18, 1920. Serial No. 417,751.

*To all whom it may concern:*

Be it known that I, HERMON JOHN, a citizen of the United States, and resident of the city of Tacoma, county of Pierce, State of Washington, have invented certain new and useful Improvements in Composition for Making Briquettes, of which the following is a specification.

This invention relates to briquettes and the process of making the same; more particularly it relates to a composition of matter for the manufacture of briquettes of that character suitable for use as fuel in furnaces, stoves, locomotives etc.; the principal object of the invention being to provide briquettes of the above character from a composition that is chiefly lignite, or brown coal, and which has mixed therewith other substances to insure its burning with intense heat and with the production of practically no smoke and with few ashes.

My composition consists in the greater part of a mixture of lignite, mixed with a binder such as tar, a filler and retarding agent such as fuller's-earth and a hardening substance such as salt.

In preparing the composition I prefer to use the different substances in about the following proportions—viz., ninety two pounds of powdered of pulverized lignite, four pounds of tar, one and one-half pounds of fuller's-earth and one half pound of sea salt.

These substances are mixed together thoroughly while under about two hundred degrees of heat, Fahrenheit, to form a plastic material of a consistency that may be pressed into small bricks, or briquettes of desired shapes. It has been found that the mixing of tar with the powdered lignite, which in itself is hard to ignite, makes it readily inflammable. The fuller's earth eliminates the smoke of combustion and retards burning to a certain desired degree. The salt is used as the hardening agent and sets the composition after it is in the molds.

Briquettes of this composition burn readily, with intense heat, are comparatively light and easily handled, produce practically no smoke when burning and leave few ashes.

Having thus described my invention, what I claim as new therein and desire to secure by Letters-Patent is—

A plastic fuel composition of the character described consisting of substances in the following proportions, viz.—ninety two pounds of powdered lignite, four pounds of tar, one and one-half pounds of fuller's earth and one-half pound of sea salt.

Signed at Seattle, Washington, this 13th day of October, 1920.

HERMON JOHN.